(12) United States Patent
Basson et al.

(10) Patent No.: US 9,691,361 B2
(45) Date of Patent: Jun. 27, 2017

(54) ADJUSTING PRESENTATION OF CONTENT ON A DISPLAY

(71) Applicant: International Business Machines Corporation, Armonk, NY (US)

(72) Inventors: Sara H. Basson, White Plains, NY (US); Dimitri Kanevsky, Ossining, NY (US); Clifford A. Pickover, Yorktown Heights, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/816,195

(22) Filed: Aug. 3, 2015

(65) Prior Publication Data

US 2017/0040002 A1 Feb. 9, 2017

(51) Int. Cl.
| | |
|---|---|
| G09G 5/37 | (2006.01) |
| G09G 5/373 | (2006.01) |
| G09G 5/30 | (2006.01) |
| G06K 9/00 | (2006.01) |
| G06F 21/55 | (2013.01) |

(52) U.S. Cl.
CPC ............ G09G 5/37 (2013.01); G06F 21/554 (2013.01); G06K 9/00228 (2013.01); G09G 5/30 (2013.01); G09G 5/373 (2013.01); G09G 2320/08 (2013.01); G09G 2320/10 (2013.01); G09G 2354/00 (2013.01); G09G 2358/00 (2013.01)

(58) Field of Classification Search
CPC .......... H04N 13/0468; H04N 13/0484; H04N 2013/0461; G09G 2358/00
See application file for complete search history.

(56) References Cited

U.S. PATENT DOCUMENTS

| | | | |
|---|---|---|---|
| 6,405,318 B1 | 6/2002 | Rowland | |
| 6,570,610 B1 | 5/2003 | Kipust | |
| 7,437,765 B2 | 10/2008 | Elms et al. | |
| 9,444,805 B1 * | 9/2016 | Saylor | H04L 63/08 |
| 2005/0086515 A1 | 4/2005 | Paris | |
| 2007/0143857 A1 | 6/2007 | Ansari | |
| 2009/0126010 A1 | 5/2009 | Chakra et al. | |
| 2009/0141895 A1 | 6/2009 | Anderson et al. | |
| 2009/0175509 A1 | 7/2009 | Gonion et al. | |
| 2009/0273562 A1 | 11/2009 | Baliga et al. | |
| 2009/0307601 A1 | 12/2009 | Kumhyr et al. | |

\* cited by examiner

*Primary Examiner* — Antonio A Caschera
(74) *Attorney, Agent, or Firm* — Alexa L. Ashworth; Ryan, Mason & Lewis, LLP

(57) ABSTRACT

A method comprises presenting content on a display associated with a computing device, determining one or more security characteristics associated with respective portions of the content on the display, detecting a presence of one or more individuals proximate to the display associated with the computing device, and modifying presentation of at least one of the portions of the content on the display based on an authorization status of at least one individual proximate to the display associated with the computing device and the security characteristics associated with the at least one portion of the content on the display.

20 Claims, 7 Drawing Sheets

ADJUSTING PRESENTATION OF CONTENT ON A DISPLAY

BACKGROUND

The present application generally relates to displaying content and, more specifically, to managing content presented on a display. Various computing devices and systems are configured to enable multitasking, which may involve a screen or display presenting content from multiple different applications or programs, or multiple different instantiations of a single application or program. In some instances, a user may prefer that certain information is not visible to others. As an example, a user may desire to hide from others' view all or a portion of the content associated with one or more of the applications or programs running on a computing device.

SUMMARY

Embodiments of the invention provide techniques for adjusting graphical characteristics of content presented on a display of a computing device.

In one embodiment, a method comprises presenting content on a display associated with a computing device, determining one or more security characteristics associated with respective portions of the content on the display, detecting a presence of one or more individuals proximate to the display associated with the computing device, and modifying presentation of at least one of the portions of the content on the display based on an authorization status of at least one individual proximate to the display associated with the computing device and the security characteristics associated with the at least one portion of the content on the display. The method is performed at least in part by the computing device.

DETAILED DESCRIPTION

Figure 1:
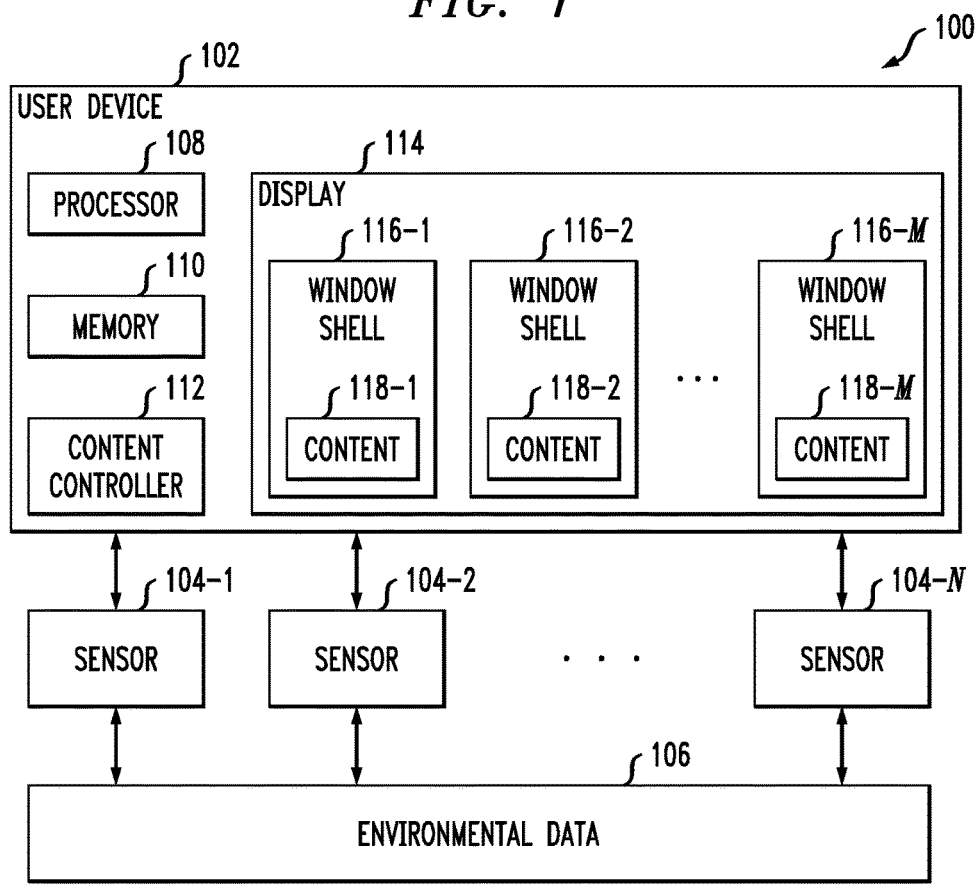
FIG. 1 depicts a user device with a content controller, according to an embodiment of the invention.

Illustrative embodiments of the invention may be described herein in the context of illustrative methods, systems and devices for adjusting or otherwise controlling the presentation of content on a user device. However, it is to be understood that embodiments of the invention are not limited to the illustrative methods, systems and devices but instead are more broadly applicable to other suitable methods, systems and devices.

Various computing devices and systems, including devices such as desktop computers, laptop computers, tablets, smartphones and other cellular phones, smartwatches, etc., are configured to enable multi-tasking. Multi-tasking may be provided by permitting a computing device to open and operate multiple different programs and applications as well as multiple instances of particular programs and applications. For example users may open multiple different applications such as word processing applications, document readers, web browsers, image viewers, e-mail clients, etc. In addition, users may open multiple different documents, presentations, web pages, images, e-mails, etc. in the various programs at the same time.

Multi-tasking on various computing devices may further present windows or other information from different applications or programs on a display at the same time. For example, a user device may present a web browser in a first window or portion of a screen or display while presenting an e-mail client, word processing application or other document or image viewer/reader in a second, different portion of the display. As another example, a user device may present two different tabs for a web browser, or two different documents, images, e-mails, etc. in different portions of a screen or display.

Some devices may not provide for multi-tasking by presenting windows from multiple applications or application instances on a screen at a given time. For example, some smartphones may only permit a user to view a single application running on the device at a particular time. Even in such cases, however, the screen or display of the smartphone may present notifications, status updates, etc. in a portion of the screen or as pop-up displays on portions of the screen.

For various reasons, a user or users may prefer that some of the content or information presented on the screen or display of a user device be kept private. As an example, a user may prefer that particular programs, documents, images, web pages, videos or other multimedia content, etc. not be visible to others. Some material may be confidential work information which is not suitable for other employees in a given entity or for non-employees of the given entity. In addition, some content or information may not be suitable for particular classes of users. As an example, various content may be age-restricted due to violence, language, etc.

In some situations, a user device may be in a location where certain content or other information should not be viewed by others in the surrounding environment. For example, in a shared workspace or home, various individuals may enter and exit the view of a screen such as the screen of a desktop computer. For mobile computing devices such as laptops, tablets, smartphones, etc., users may often be in public places or other environments in which various individuals may see sensitive or confidential content that is presented on a screen or display. Users may prefer not to darken or otherwise obscure an entire display when others are present. To increase comfort, efficiency and overall user experience, users may instead prefer that only materials deemed confidential or otherwise not suitable for others be obscured on the screen or display of a user device.

Users that are multi-tasking must be cognizant of what is potentially open and visible on a screen. Users must also be constantly aware of which other people are present. One option for maintaining the security and privacy of content displayed on the screen is for a user to quickly close or minimize content not suitable for others such that the content is not visible to others. Users, however, may miss closing materials that are sensitive and confidential or unintentionally shift down programs that do not display sensitive or confidential information.

Some embodiments provide techniques for altering the graphical characteristics of a screen or display of a computing device based on analysis of the contents of the display and individuals proximate to the computing device. In some embodiments, windows or other portions of the screen containing confidential or private information are faded or otherwise obscured if an authorized user is not within a certain radius of the computing device for a particular amount of time. In some embodiments, windows or other portions of the screen containing confidential or private information are faded or otherwise obscured on detecting that unauthorized individuals are proximate the computing device or within a particular viewing angle of a screen or display associated with the computing device.

FIG. 1 depicts a system 100, including user device 102, sensors 104 and environmental data 106. User device 102 is an example of a computing device, and may be a mobile computing device such as a laptop, tablet, smartphone, smartwatch, etc. User device 102 utilizes the environmental data 106 gathered using sensors 104 to manage and adjust the presentation of content on the display 114.

As shown in FIG. 1, user device 102 includes a processor 108, memory 110, content controller 112 and display 114. Processor 108 may comprise a microprocessor, a microcontroller, an application-specific integrated circuit (ASIC), a field programmable gate array (FPGA) or other type of processing circuitry, as well as portions or combinations of such circuitry elements. The memory 110 may comprise electronic memory such as random access memory (RAM), read-only memory (ROM), optical and magnetic disks, or other types of memory, in any combination. While not explicitly shown in FIG. 1, the user device 102 may include a network interface comprising circuitry and other elements used to interface the user device 102 with respective ones of the sensors 104 as well as other user device (not shown in FIG. 1) and to various types of networks (not shown in FIG. 1). Network types include, by way of example, a wide area network (WAN), a local area network (LAN), a satellite network, a public switched telephone network (PSTN) or other telephone network, a cellular network, the Internet, and various portions of combinations of these and other network types.

The display 114 may be any one of or a combination of display types including but not limited to liquid crystal display (LCD), light emitting diode (LED) display, plasma display, electronic paper, etc. The display 114 may be physically incorporated in the same housing as the processor 108 and memory 110. The display 114 may alternatively be an external display connected or coupled to the user device 102. The user device 102 may be, by way of example, a laptop, tablet or smartphone wherein the processor 108, memory 110 and display 114 are in the same physical housing. The user device 102 may alternately be a desktop computer, where the display 114 may be an external monitor connected or coupled to a physical housing including the processor 108 and memory 110. Various other examples are possible, and embodiments are not limited to these specific examples.

As shown in FIG. 1, the display 114 includes a number of window shells 116-1, 116-2, . . . 116-M presenting corresponding content 118-1, 118-2, . . . , 118-M. Each window shell 116 corresponds to a particular portion of the display 114. By way of example, each window shell 116 may represent a different program or application, a different instance of a program or application, different tabs, sections or other portions of a program or application, etc. A window shell 116 need not be associated with a particular application, application instance or part of an application instance. In some embodiments, one or more of the window shells 116 may represent a status bar, notification area, pop-up display, etc.

The content 118 may be visible content, audible content or a combination of visible and audible content. Examples of content 118 include documents, presentations, e-mails, images, web pages, videos, etc.

Sensors 104-1, 104-2, . . . , 104-N may be various types of sensors, including but not limited to microphones, cameras, motion detectors, ambient light detectors, accelerometers, gyroscopes, input devices, etc. Although shown as external to the user device 102 in FIG. 1, one or more of the sensors 104 may in some embodiments be part of the user device 102. For example, the user device 102 may be a laptop, tablet, smartphone, etc. with one or more built-in microphones and cameras. The sensors 104 may alternatively be external to the user device 102 but connected or coupled to the user device 102. As an example, the user device 102 may be a desktop computer having a microphone or webcam connected thereto. The sensors 104 capture environmental data 106, which is used to detect the presence of persons proximate to the user device 102.

Content controller module 112 manages the content 118 presented on the display 114. Various details regarding the functionality of the content controller module 112 will be discussed in further detail below with respect to FIGS. 2-4.

Figure 2:
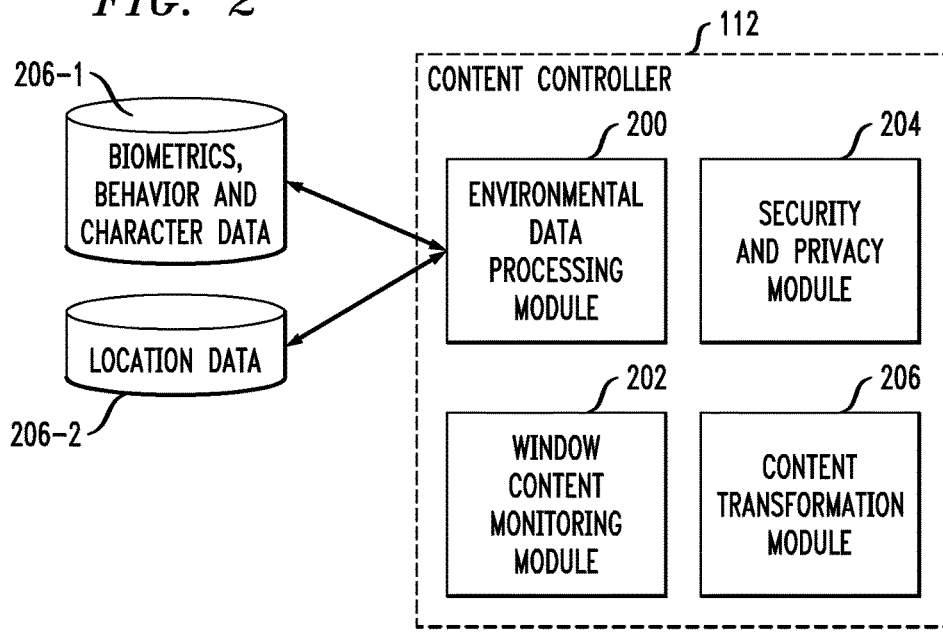
FIG. 2 depicts a detailed view of the content controller shown in FIG. 1, according to an embodiment of the invention.

FIG. 2 shows a detailed view of the content controller module 112, which includes environmental data processing module 200, window content monitoring module 202, security and privacy module 204 and content transformation module 206.

Environmental data processing module 200 receives input from data sources including biometrics, behavior and character data 206-1 and location data 206-2. The data sources 206 may be part of the memory 110, or may be part of an external memory, database, or other storage external to the user device 102. The data sources 206 store information gathered from sensors 104. The data sources 206 may store raw data from the sensors 104, or other information derived from raw data gathered by various ones of the sensors. Environmental data processing module 200 uses the data sources 206 to detect and identify persons located near the display 114 of the user device 102.

It is to be appreciated that various embodiments described below are in the context of a user device 102 wherein the display 114 is part of the physical housing of the user device 102. An example of such a user device 102 is a smartphone, tablet or laptop. Embodiments, however, are not so limited. As discussed above, in some embodiments the user device 102 may be computing device such as a desktop computer, where the display 114 may be external to a physical housing such as a computer tower or case. For such devices, a person may be proximate to the display 114 without necessarily being proximate to the physical housing such as the computer tower. For ease of description below, references to a user being located near or proximate to the user device 102 should be understood to refer to a user being located near or proximate the display 114 of the user device 102.

The environmental data processing module 200 may use the data sources 206 so as to detect unauthorized users located near the user device 102, to detect authorized users located near the user device 102, or to detect both authorized and unauthorized individuals located near the user device 102. In some embodiments, the presentation of security-restricted portions of the content 118 on the display 114 is modified or transformed based on the detection of unauthorized users in proximity to the user device 102. In other embodiments, however, the presentation of security-restricted portions of the content 118 on display 114 is modified or transformed responsive to detecting an absence of at least one individual authorized to view the security-restricted portions of the content 118. Such transformation may occur even if there are no unauthorized individuals in proximity to the user device 102.

The environmental data processing module 200 may utilize biometrics data from the data source 206-1 to perform voice recognition, facial recognition, motion detection to determine manner of walking or other movement, etc. so as to detect and identify persons located near or proximate to the user device 102. For example, facial recognition may be used to positively identify specific persons located near the user device 102. This may include positively identifying one or more specific authorized individuals and positively identifying one or more specific unauthorized individuals. For example, facial recognition may be used to determine that if a given person is located near the user device 102, the presentation of particular types of content should immediately fade, close or otherwise be modified. If facial recognition cannot positively identify one or more individuals as authorized or unauthorized users, the presentation of security-restricted content may automatically by modified.

Speech or voice recognition may also be used to determine that additional persons have entered the vicinity or proximity of the user device 102. Speech recognition, similar to facial recognition, may be used to positively identify specific individuals as authorized or unauthorized or to detect unknown individuals and take appropriate action. Biometrics may also be used to detect the class of individuals proximate to the user device. For example, speech and/or facial recognition may be used to classify individuals by age, gender, etc. Motion detection, as discussed above, may further or alternatively be used to detect individuals in proximity to the user device 102.

In some embodiments, various biometrics may be combined to identify individuals located near user device 102. The particular biometrics used may be based in part on the hardware capability of the user device 102 and sensors 104, such as the presence of one or more cameras, microphones, motion detectors, etc. Other input devices of the user device 102 may also be utilized for detecting the presence of individuals proximate to the user device 102. By way of example, keyboard typing, touchscreen input, mouse movements, gyroscopes, accelerometers, etc. may be used. The time since a last keystroke, touchscreen input, mouse movement or general movement of the user device 102 detected using gyroscopes, accelerometers, etc. may be used to determine the presence or absence of individuals proximate to the user device 102.

One or more proximity thresholds may be used for determining whether a user is located near or proximate to the user device 102. Different thresholds may be used for different types of environmental data 106 obtained using sensors 104. For example, motion detection and location data may be utilized to determine a distance from a particular individual to the display 114. Speech or voice recognition may use audio volume to determine a distance from a particular individual to the display 114. Facial recognition may be used to determine whether a particular individual is within a viewing angle of the display 114.

In some embodiments, triggering a single proximity threshold may result in detection of a particular individual as near the user device 102. For example, a particular individual may be detected as near or in proximity to the user device 102 if motion detection and/or location data indicates that the person is within a given physical distance threshold of the user device 102. As another example, a particular individual may be detected as near or in proximity to the user device 102 if speech recognition data is above a given decibel threshold.

In other embodiments, multiple proximity thresholds must be triggered to detect a particular individual as being near or proximate to the user device 102. For example, a particular individual may be detected as near or proximate to the user device 102 only if motion detection and/or location data indicates that the person is within the given physical distance threshold of the user device 102 and speech recognition data is above the given decibel threshold.

Multiple proximity thresholds may also be linked with one another. As discussed above, various computing devices may be used in public places. As an example, consider a smartphone that is used on a train or subway. Speech recognition or motion detection data may be indicate that there are several individuals near or proximate the smartphone, but some or all of those users may not be in position to actually see the screen or display of the smartphone. As such, proximity thresholds such as the physical distance threshold of decibel threshold may be combined with a viewing angle threshold for detecting proximity to the smartphone.

In some embodiments, the values for different proximity thresholds are parameters that are predefined. For example, a user may set the values for proximity thresholds. A corporation or other entity, such as a government, club, etc. may alternately set the values for proximity thresholds. In other embodiments, mathematical analysis such as machine learning algorithms based on motion detection, sound detection, or other biometric detection may be used in conjunction with a history of use of the user device 102 to set the values for different proximity thresholds.

The values of proximity thresholds may also depend on context. In some embodiments, different proximity profiles may be used having different values for the same proximity thresholds. A proximity profile may be selected based on location data 206-2, where different locations or environments are classified by riskiness or security. In certain public places, such as parks, cafes, restaurants, libraries, etc., other individuals are often unauthorized individuals. In other more private places, such as a company building or a user's home, other individuals are more likely to be authorized individuals. Thus, the proximity profile or values of the proximity thresholds may vary based on the current location of the user device 102.

It should be understood that the above proximity thresholds are presented by way of example only, and that embodiments are not limited solely to the specific examples described above. Instead, various other proximity thresholds, including combinations of the above-described proximity thresholds, may be used in some embodiments.

The environmental data processing module 200 may further utilize characteristics data from data source 206-1 to detect and identify persons located near the user device 102. As an example, the environmental data processing module 200 may determine gender at least in part by analyzing the clothing worn by different persons located near the user device 102. The environmental data processing module 200 may also utilize behavioral data from data source 206-1 to detect and identify persons located near the user device 102. Such behavioral data may include, by way of example, where particular persons are looking. Thus, in some embodiments the environmental data processing module 200 uses the data sources 206 to perform gaze detection. Location data from data source 206-2 is also utilized to detect and identify persons located near the user device 102.

Window content monitoring module 202 obtains information relating to which person or persons are authorized to view content currently presented on the display 114 of the user device 102. In some embodiments, this involves determining whether different portions of the content 118 presented on the display 114 are security-restricted. Security-restricted content may be assigned different ones of a plurality of different security levels, such low, medium, high, etc. Security levels may also or alternatively be based on the type of content. As an example, there may be separate security levels for confidential information, adult content, financial information, multimedia information, etc. It is important to note, however, that different types of content may be assigned the same security level. For example, a highest security level may be assigned to confidential workplace information and to personal financial information.

Security restrictions may be explicitly set by a user or entity. For example, a user or entity such as an employer may be permitted to designate particular content such as individual files or programs as being security-restricted. In some embodiments, this may include assigning a security level to the content. Different types of content may also be designated as security-restricted. For example, all multimedia files may be designated as having a certain security level or other security restriction. Certain programs or applications may also be designated as having particular security levels or security restrictions. As an example, an email client, program or application may be designated as having a given security restriction. The designation of a particular type of content as having a first security restriction, however, does not preclude a specific instance of that content as having a second security restriction different than the first security restriction. For example, a user may designate that all video files are security-restricted, but then choose to allow particular video files as being unrestricted. As another example, a user may designate that a program such as a web browser has a low security level restriction while designating specific web sites or web pages as having a medium or high security level restriction. Security restrictions, however, need not be specifically designated or set by a user or entity.

In some embodiments, machine learning may be used to set the security level or other security restrictions for particular content. For example, a user may set up a blacklist of particular words or phrases that should trigger a security restriction. The user need not specifically designate each file containing such words or phrases as having a security restriction. Instead, the window content monitoring module 202 may scan a document, web page, email, presentation, etc. for particular words or phrases and assign security restrictions automatically. Similarly, images, audio files, video files, etc. may be scanned for content relating to sensitive topics and marked with appropriate security restrictions. The security restrictions for some content may also be based on security restrictions assigned to other content. For example, word spotting may be done to determine the security of a new document or email based on its similarity to previously-classified documents or emails.

File names, metadata, or other subject matter analysis may also be utilized to assign security restrictions to particular files, web pages, programs, etc. As an example, the metadata associated with a multimedia file such as a movie may be used to assign security restrictions. A particular genre of movies, such as horror movies, may be assigned a security restriction due to its likelihood of containing violent content. As another example, references within files may be used to assign security restrictions. The mention of a particular product or work project, for example, may lead to classification of a file or other content as work confidential. Similarly, reference to a particular individual, such as an employee or other individual associated with a given entity, may cause classification of content as work confidential.

The window content monitoring module 202 also determines the permissions or access requirements for viewing different portions of the content 118 presented on the display 114. Permissions and access requirements may be associated with particular persons or classes of persons such as adults, children, employees of a given entity, etc. In some embodiments, such permissions and access requirements are explicitly set. For example, the authorization status for content X may be set as "transform content X when person A, B or C is present." As another example, the authorization status for content X may be set as "transform content X unless person D is present." As a further example, the authorization status for content X may be set as "transform content X when person E is present unless person F is also present." Authorization status may also be based on classes of users, such as adults and children, rather than on the identity of specific persons.

In some embodiments, authorization status may be further based on other factors such as location or time of day in addition to or as an alternative to being based on the identity of particular persons or classes of persons. As an example, the authorization status for content X may be set as "transform content X when person A, B or C is present and the user device is not in location G." As another example, the authorization status for content X may be set as "transform content X when the user device is in location H and the time is between T1 and T2." It is important to note that embodiments are not limited solely to the specific examples given above. The authorization status for different portions of content may be set based on various combinations of factors, including the presence or absence of particular persons or classes of persons, location, time of day, etc.

Figure 3:
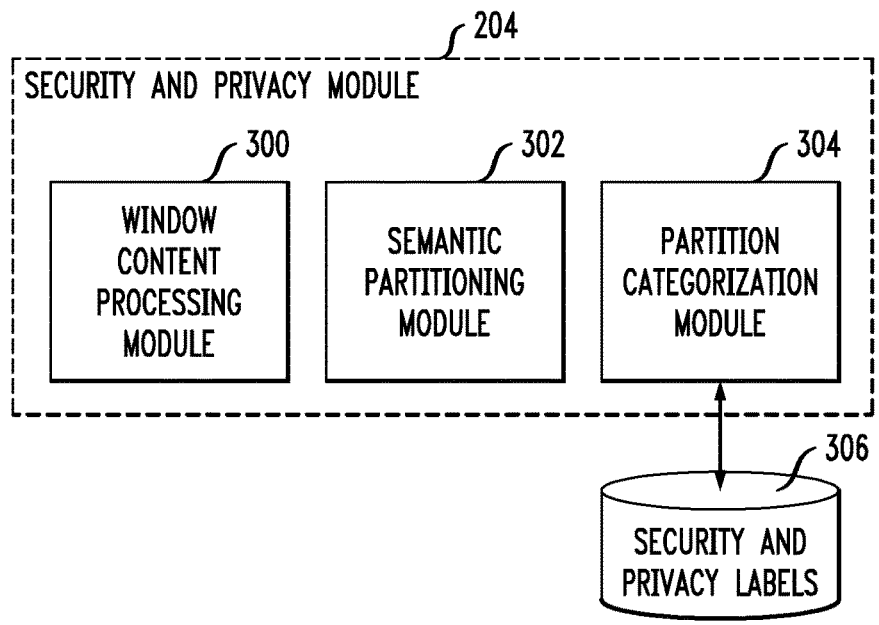
FIG. 3 depicts a detailed view of the security and privacy module shown in FIG. 2, according to an embodiment of the invention.

Security and privacy module 204 is used to apply labeling to different portions of the content 118 presented on display 114. FIG. 3 shows a detailed view of the security and privacy module 204, which includes window content processing module 300, semantic partitioning module 302 and partition categorization module 304. Window content processing module 300 processes the content 118 presented on display 114 into data to be classified.

The semantic partitioning module 302 partitions this data into semantic chunks. Semantic partitioning module 302 can identify images, or portions thereof as having certain characteristics. For example, the semantic partitioning module 302 may analyze an image to identify objects such as blueprints, diagrams, plans, etc. as work products or guns, knives, etc. as weapons. Various other examples are possible, including identify nudity or other adult imagery, violence, etc. Semantic partitioning module 302 may also analyze text and/or audio content to identify descriptions of company products, strategies, proposals, contracts etc. or to identify financial information, medical information or other private information.

Partition categorization module 304 assigns a label to the different partitions of data determined by the semantic partitioning module 302. The partition categorization module 304 uses security and privacy labels data store 306, which may be a database or other storage of different content labels. Content labels may include, by way of example, confidential, adult, violent, personal, financial, medical, etc.

Figure 4:
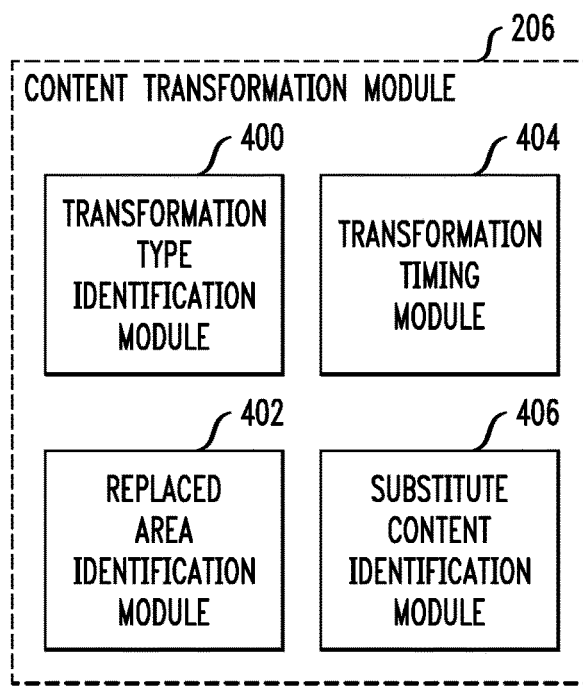
FIG. 4 depicts a detailed view of the content transformation module shown in FIG. 2, according to an embodiment of the invention.

Content transformation module 206 utilizes information from the security and privacy module 204 to modify or alter presentation of at least a portion of the content 118 on the display 114 of user device 102. Such modification may include, by way of example, masking confidential terminology or data, removing or masking adult content, filtering audio to mask or remove explicit language, etc. FIG. 4 shows a detailed view of the content transformation module 206, which includes transformation type identification module 400, replaced area identification module 402, transformation timing module 404 and substitute content identification module 406.

Transformation type identification module 400 identifies the type of modification or adjustment to make to different portions of the content 118 presented on display 112. In some embodiments, the modification may include adjusting one or more graphical characteristics of portions of the content 118 presented on display 112. The modification may also include adjusting audio characteristics of portions of the content 118.

Adjusting the graphical characteristics of a particular portion of content 118 in some embodiments includes fading a window or portion thereof. Fading the window may comprise increasing the transparency of the window to a point where all or some portion of the content thereof is invisible or difficult to view from a specified distance. Fading the window may alternately comprise changing the color of the window to white or some other specified color. Fading the window may alternately comprise increasing the opaqueness of all or some portion of the content. Fading a portion of the content may be a function of time, in that the content may gradually fade over some defined time interval. Alternately, the fading may be instantaneous of near instantaneous.

In some embodiments, adjusting the graphical characteristics of the content 118 includes obscuring all or part of a particular portion of the content. Obscuring may be accomplished using a variety of techniques, such as blacking or whiting out particular words or phrases in a document or image. It is to be appreciated that the choice of the particular color or colors used to obscure words, phrases or portions of an image is not limited solely to using black or white, but may instead use various different colors including using different colors to obscure different portions of content. Obscuring may further or alternatively involve overlaying a portion of content with a mesh, grid or other pattern. Obscuring may further or alternatively involve pixelating a portion of content, or altering the ordering of characters or portions of the content. The graphical characteristics of content may also or alternatively be adjusted by increasing or decreasing the size of a portion of the content. For example, obscuring the content may involve shrinking the size of a window such that the text, images or other information presented is not readable from a particular distance. Various other techniques may be used to obscure content, including combinations of the techniques described above.

In other embodiments, adjusting the graphical characteristics involves replacing the original content with other content. Consider, as an example, a situation in which presentation of a confidential work document is to be modified. In some embodiments, such modification is effected by replacing the confidential work document with a different work document that is not confidential. More generally, content of a first type subject to a security restriction may be replaced with other content of the first type that is not subject to the security restriction. Use of this feature allows a user to hide the fact that the presentation of content has been modified. Continuing with the example above, in other embodiments the confidential work document may be replaced with a web page, email, image, etc. More generally, the presentation of content of a first type may be modified by replacing the content of the first type with content of a second type different than the first type.

In some embodiments, modifying presentation of at least a portion of the content 118 presented on display 114 may involve substituting certain words in a text document, where the nature of this substitution is specified by the user of the user device 102 or by a third party such as an employer of the user. As an example, the specific name of a particular product may be replaced by a generic product, and the nature of this substitution may be stored in a table or database supplied by the user or third-party. Rules for such substitutions may also be specified and used. For example, a rule may specify "if the phrase 'Machine 123' appears in the document, replace it with the phrase 'machine.'" Alternatively, the system and method may perform these kinds of replacements in an intelligent and even more automated fashion, for example, by automatically replacing certain sensitive words with synonyms in a dictionary, or replacing the specific names of people with generic names of people, etc.

Similar substitution may be used for other types of content, such as figures, tables, photos, various kinds of diagrams, images, etc. Specified figures, numbers, words, graphics or parts thereof may be substituted in accordance with rules specified by the user or a third party. For example, the illustration of a particular product may be replaced by a generic product, and the nature of this substitution may be stored in a table or database supplied by the user or third-party. For example, a rule may specify "if an illustration of "Machine 123" appears, replace it with an illustration of a generic machine." Similar to the text substitution described above, this substitution or replacement may be performed in an intelligent and even more automated fashion by replacing certain sensitive figures with generic figures without requiring a user or third-party to specify the precise replacement, or by replacing specific products or photos of people of people with generic photos of products or people without requiring a user or third party to specify the precise replacement, etc.

In some embodiments, users are made aware when a substitution is being made on a first device by a notification presented on a second device. The notification may be, by way of example, a red icon or other warning or notification appearing on the second device. The first device may be a user's smartphone, tablet or laptop while the second device may be a user's heads-up display, smartwatch, etc. Various other types of devices may be used as the "first" and "second" devices in other embodiments. Continuing with the example above, if the phrase "Machine123" appears in a document and it is replaced with the phrase "machine," a wireless or other signal may be transmitted from the first device to the second device to indicate that the replacement has occurred and cause presentation of an appropriate notification by the second device. It is important to note that the notification need not be a visual notification. In some embodiments, the notification may be an audio notification, a vibration or pulse of a user device, etc.

In some embodiments, a third party device may also be notified that a modification has occurred. For example, consider a company with various employees. The company may wish to track when, where and how often its employees' devices modify the presentation of confidential work materials. Thus, whenever an employee's device modifies presentation of confidential work material, a third party device controlled by the employer may be notified.

Some screens and displays are capable of presenting content based on the angle of the viewer with respect to the screen or display. For such directional viewing displays, adjusting the graphical characteristics may take into account viewer position. As an example, consider two persons sitting next to one another on an airplane. A directional viewing display may present content such that a person sitting to the left of the screen sees something different than a person sitting in front of the screen. To adjust graphical characteristics, confidential, private or otherwise security-restricted content may be replaced with something for a "bordering" viewer of the screen, e.g., the person sitting to the left of the screen, while keeping the confidential content available for a "direct" viewer of the screen, e.g., the person sitting in front of the screen. More generally, modifying presentation of the content on display 114 may include adjusting graphical characteristics of at least a portion of the content based on positions and viewing angles of persons proximate to the user device 102.

While various ones of the examples presented above have been described in the context of adjusting graphical or visual characteristics of a portion of the content, embodiments are not so limited. For example, presentation of audio content may be modified in a similar manner by blanking out a portion of the audio, speeding up a portion of the audio, bleeping or otherwise obscuring a portion of the audio, replacing a portion of the audio, etc. In addition, while some of the techniques have been described in the alternative above, embodiments may use combinations of the above-described and other techniques to modify the presentation of content on a screen or display.

The transformation type identification module 400, as discussed above, may select the techniques to be used to modify presentation of different portions of the content 118 on display 114. This selection may be based on the type of content, environmental factors, and/or location. For example, different techniques can be used for adjusting graphical characteristics of images and graphical characteristics of text documents. Different techniques may be used for the same type of content based on environmental factors such as the number of persons within a proximity of the user device 102. As an example, a user may specify that different techniques be used if more than a threshold number of persons are detected within the proximity of the user device 102. The technique may also or alternatively depend on the location of the user device 102. For example, in a workplace confidential work documents may be replaced with non-confidential work documents while in a public setting such as a park confidential work documents may be replaced with content of a different type altogether. It is important to note that these examples are not an exhaustive list of the possible selection preferences for different transformation types. Various embodiments may use different selection preferences for transformation types.

Replaced area identification module 402 identifies which parts of a screen should be altered. For example, the replaced area identification module 402 may identify that window shell 116-1 including content 118-1 should be altered while other window shells such as window shell 116-2 need not be altered. The replaced area identification module 402 may also indicate that only part of a particular window or other portion should be altered. Consider, for example, a text document wherein only a subset of the text is subject to a security restriction. The replaced area identification module 402 can specify only that portion of the text subject to the security restriction as a portion that needs to be altered. Similarly, the replaced area identification module 402 may specify that all or part of an image, audio, email, document, etc. should be altered.

Transformation timing module 404 determines when to make a transformation or modification to presentation of a portion of the content 118 on display 114. In some embodiments, the content 118 is constantly monitored so as to determine when portions of the content 118 are subject to security restrictions. Then, when the content controller 112 detects other persons in proximity of the user device 102 the transformation timing module 404 controls when to transform such portions of the content 118. As an example, the content controller 112 may determine that a person not authorized to view a portion of the content 118 is within a certain distance of the user device 102. The transformation timing module 404 may immediately cause transformation of that portion of the content, or may wait based on other factors. For example, the transformation timing module 404 may wait until the person is looking at the display 114 of user device 102 or gets within some defined viewing distance of the display 114 of user device 102. The transformation timing module 404 may utilize environmental data 106 obtained using sensors 104 to make such determinations.

Substitute content identification module 406 identifies the replacement content to be utilized for different transformation types. Consider, for example, a portion of the content that contains violent or adult material to be replaced. This may involve erasing blood, weapons, nudity or other content from an image, blurring or pixelating portion of the image, etc. As another example, curse words or other explicit language may be blacked or white out, bleeped out or scrambled, etc. In some embodiments, the audio level may be decreased based on the proximity of other users to the user device 102, e.g., the amount of reduction in audio volume increases the closer unauthorized individuals are to the user device 102. Similarly, the level of visual or graphical content alteration may be based on the distance of unauthorized individuals to the user device 102. For example, the level of shrinking, dimming or fading of visual content may be based on how close unauthorized individuals are to the user device 102.

The substitute content identification module 406 may also select replacement content based on environmental factors. For example, the replacement contents may be based on the types of individuals detected within the proximity of the user device 102. Consider, as an example, an image containing violent or adult content. If the other individuals detected within the proximity of the user device 102 are determined to be adults, a violent image may be replaced by removing blood from the image. If the other individuals detected within the proximity of the user device 102 are determined to be children, or a mix of one or more children and one or more adults, the violent image may be faded out entirely or replaced with a non-violent image altogether.

As another example, consider a user device 102 wherein one of the sensors 104 detects ambient light. Certain screens and displays may have significant glare reducing the visibility of the content presented based on the amount of ambient light. Therefore, to obscure portions of the content a fading technique may be used wherein the brightness level of at least a portion of the display 114 is adjusted. The level of brightness adjustment may be based on ambient light. For example, in a dark environment significant brightness adjustment may be needed to obscure content subject to security restrictions whereas in a sunny or bright environment a relatively small brightness adjustment may be sufficient to obscure the content subject to security restrictions.

It is important to note that the substitute content identification module 406 may utilize various other environmental factors for selecting replacement content in addition to or in place of the specific examples discussed above.

In some embodiments, the content controller 112 generates a notification for presentation on the display 114 indicating that the presentation of one or more portions of the content 118 on the display 114 has been modified. As an example, assume that that content 118-2 in window shell 116-2 is confidential, private or otherwise security-restricted. When an unauthorized individual or individuals are detected within a certain proximity of the user device 102, the content 118-2 in window shell 116-2 may be replaced or transformed by content transformation module 206. After a certain period of time, the content controller 112 may generate and display a notification on the display 114 indicating that the presentation of content 118-2 has been modified. The notification, however, need not necessarily be a visual notification. In some embodiments, may be an audio notification, a vibration or pulse of a user device, etc.

The generated notification serves as a reminder to a user, and may further comprise providing user interface options allowing the user to continue the modified presentation of content 118-2 on the display 114, to revert the modified presentation of content 118-2 to its original presentation, or to remove the content 118-2 from presentation on the display 114. The user interface options may further allow the user dismiss notifications without taking any action. Notifications may be generated periodically until the presentation of content 118-2 is either reverted to its original form or the content 118-2 is removed from presentation on display 114 altogether.

Controller 112 may also or alternatively generate other notifications to the user. In some embodiments, a notification icon or other indicator may be shown on the display 114 when presentation of one or more portions of content has been modified. For example, some screens have designated status bars or notifications areas. For such screens, a notification icon or other indicator may be displayed whenever presentation of at least a portion of the content 118 on display 114 has been modified. Controller 112 may also periodically ask a user of the user device 102 whether a particular modification is still needed, or to otherwise seek input from the user to ensure that the user realizes that the modification is in effect.

The controller 112 may further provide user interface options on the display 114 allowing a user to confirm or override a decision to modify presentation of at least a portion of the content 118 on the display 114. Feedback from the user via such user interface options may be utilized in machine learning algorithms for future classification of content as being subject to one or more security restrictions.

Figure 5:
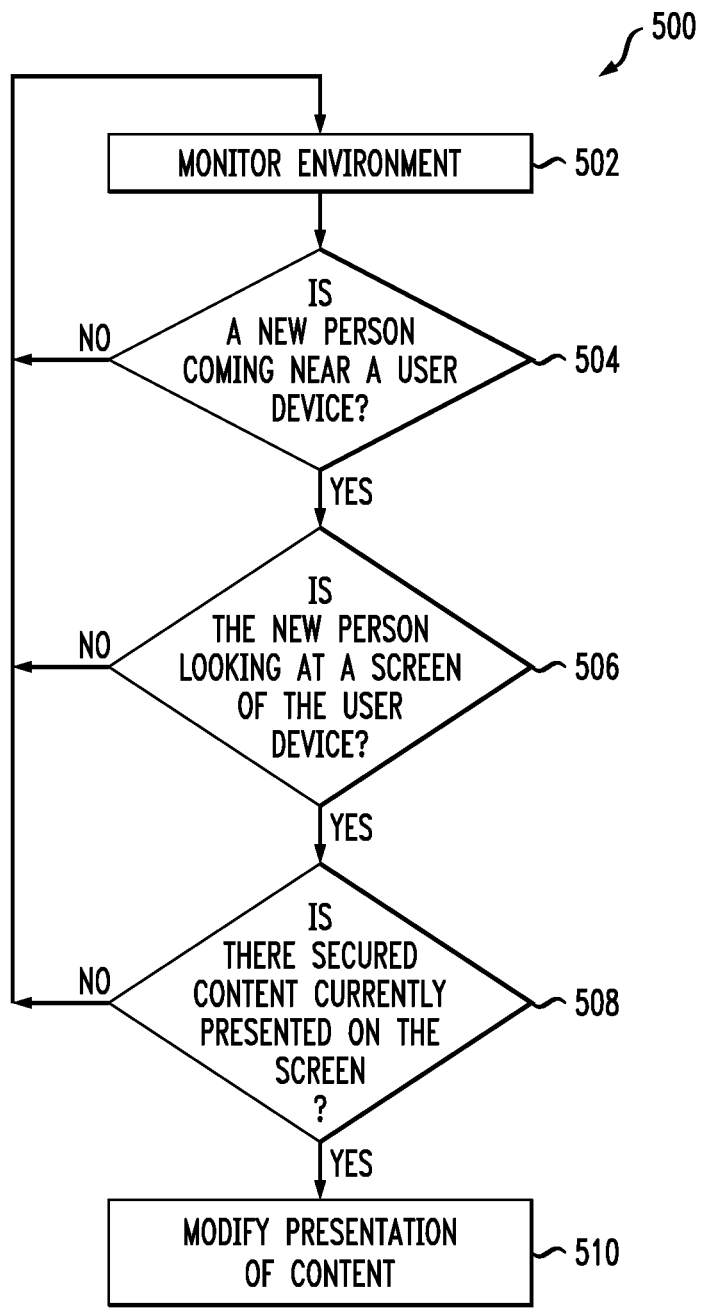
FIG. 5 depicts a process for controlling presentation of content on a computing device, according to an embodiment of the invention.

FIG. 5 shows a process 500 for controlling presentation of content on the user device 102. The process begins in step 502, monitoring the environment. Step 502 may include obtaining environmental data 106 from sensors 104 as described above with respect to FIG. 1. In step 504, a decision is made as to whether a new person is coming near the user device 102. In some embodiments, step 504 may further include determining whether one or more persons previously located near or proximate to the user device still remain. Thus, step 504 may more generally check for changes in the persons located near or proximate to the user device 102.

If no new person or persons are detected as coming near or proximate to the user device 102, the process continues with step 502, monitoring the environment. If a new person or persons are detected, the process 500 continues with step 506 where a determination is made as to whether the new person or persons are looking at the screen or display 114 of user device 102. This may involve utilizing one or more proximity thresholds as described above. For example, step 506 may include determining whether the new person is within a threshold physical distance and within a viewing angle of the display 114 of user device 102. If the new person is not looking at the screen or display of the user device 102, the process 500 again continues with step 502, monitoring the environment. If the new person is looking at the screen or display 114 of the user device 102, the process 500 continues with step 508.

In step 508, a determination is made as to whether the screen or display 114 of the user device is currently showing any security-restricted content. As discussed above, the display 114 of the user device 102 may present some content subject to security restrictions and some content which is not subject to security restrictions. If the display 114 is currently presenting at least some security-restricted content, the process continues with step 510. Otherwise, the process 500 continues with step 502, monitoring the environment.

The presentation of content on the screen or display 114 is modified in step 510. It is important to note that modifying the screen content is based on analysis of the status of the new person with respect to the security-restricted content being displayed on the user device 102. For example, if the new person or persons are authorized to view the security-restricted content, no modification is necessary. If at least one new person is not authorized to view at least a portion of the security-restricted content, then the presentation of that portion of the security-restricted content is modified. Such modification, as described above, may include altering one or more characteristics of the display 114. The modification does not require changing the underlying content. If the security-restricted content is a confidential work email, for example, modifying presentation of the content does not change or modify the confidential work email itself. In addition, step 510 does not require modifying the entire screen or display 114. Instead, only the portion of the screen of display 114 subject to the security restriction needs to be modified.

Figure 6:
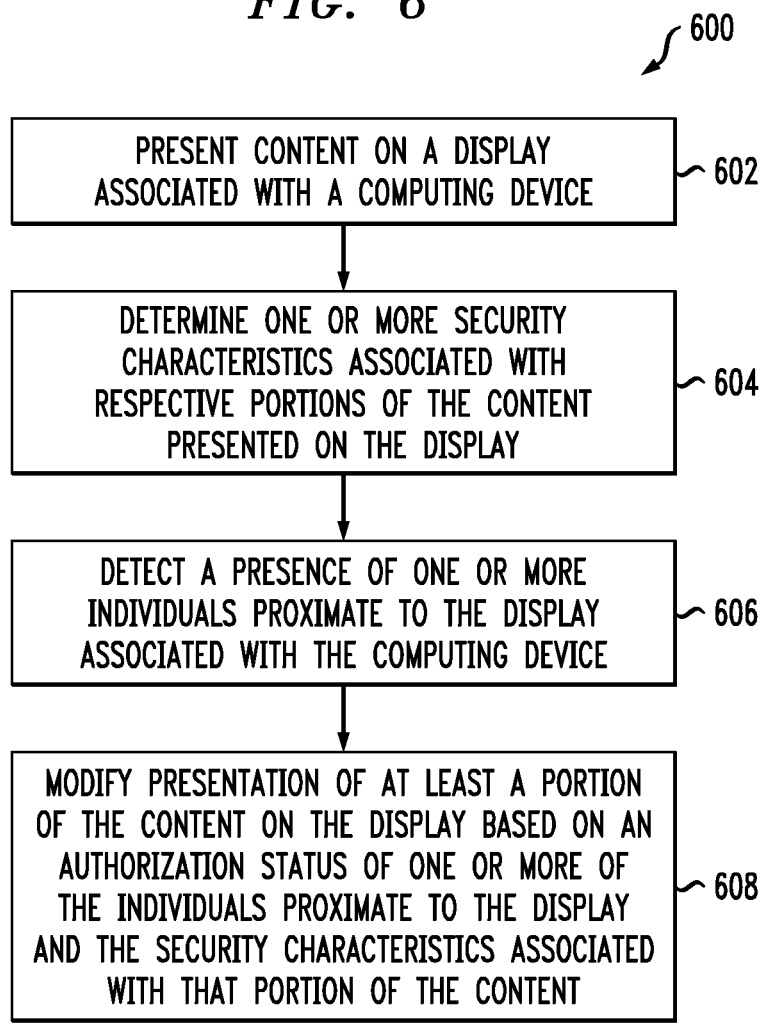
FIG. 6 depicts another process for controlling presentation of content on a computing device, according to an embodiment of the invention.

FIG. 6 shows another process 600 for controlling presentation of content on a computing device such as user device 102. Process 600 begins with presenting content 602 on a display associated with a computing device. The process 600 continues with determining 604 one or more security characteristics associated with respective portions of the content presented on the display and detecting 606 a presence of one or more individuals proximate to the display associated with the computing device. Presentation of at least a portion of the content on the display is modified 608 based on an authorization status of the one or more of the individuals proximate to the display associated with the computing device and the security characteristics associated with that portion of the content.

Embodiments of the present invention may be a system, a method, and/or a computer program product. The computer program product may include a computer readable storage medium (or media) having computer readable program instructions thereon for causing a processor to carry out aspects of the present invention.

Figure 7:
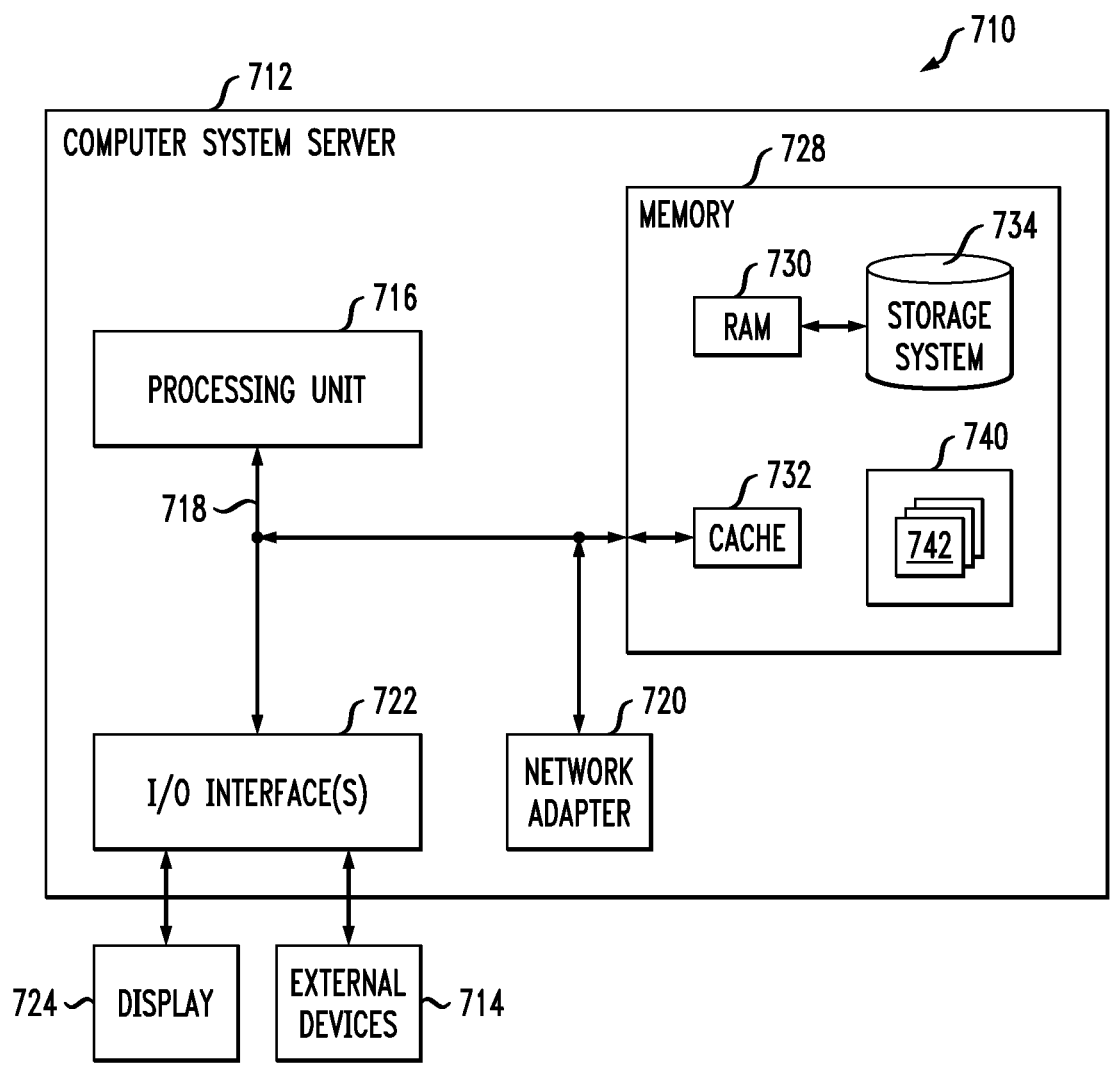
FIG. 7 depicts a computer system in accordance with which one or more components/steps of techniques of the invention may be implemented according to an embodiment of the invention.

Accordingly, the architecture shown in FIG. 7 may be used to implement the various components/steps shown and described above in the context of FIGS. 1-6.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 7, a schematic of an example of a cloud computing node is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

One or more embodiments can make use of software running on a general-purpose computer or workstation. In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via I/O interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computer system/server 712 in FIG. 7 is an example of a cloud computing node. It is to be appreciated, however, that the computer system/server 712 in FIG. 7 is only one example of a suitable cloud computing node and is not intended to suggest any limitation as to the scope of use or functionality of embodiments of the invention described herein. Regardless, the computer system/server 712 is an example of a cloud computing node capable of being implemented and/or performing any of the functionality set forth hereinabove.

Figure 8:
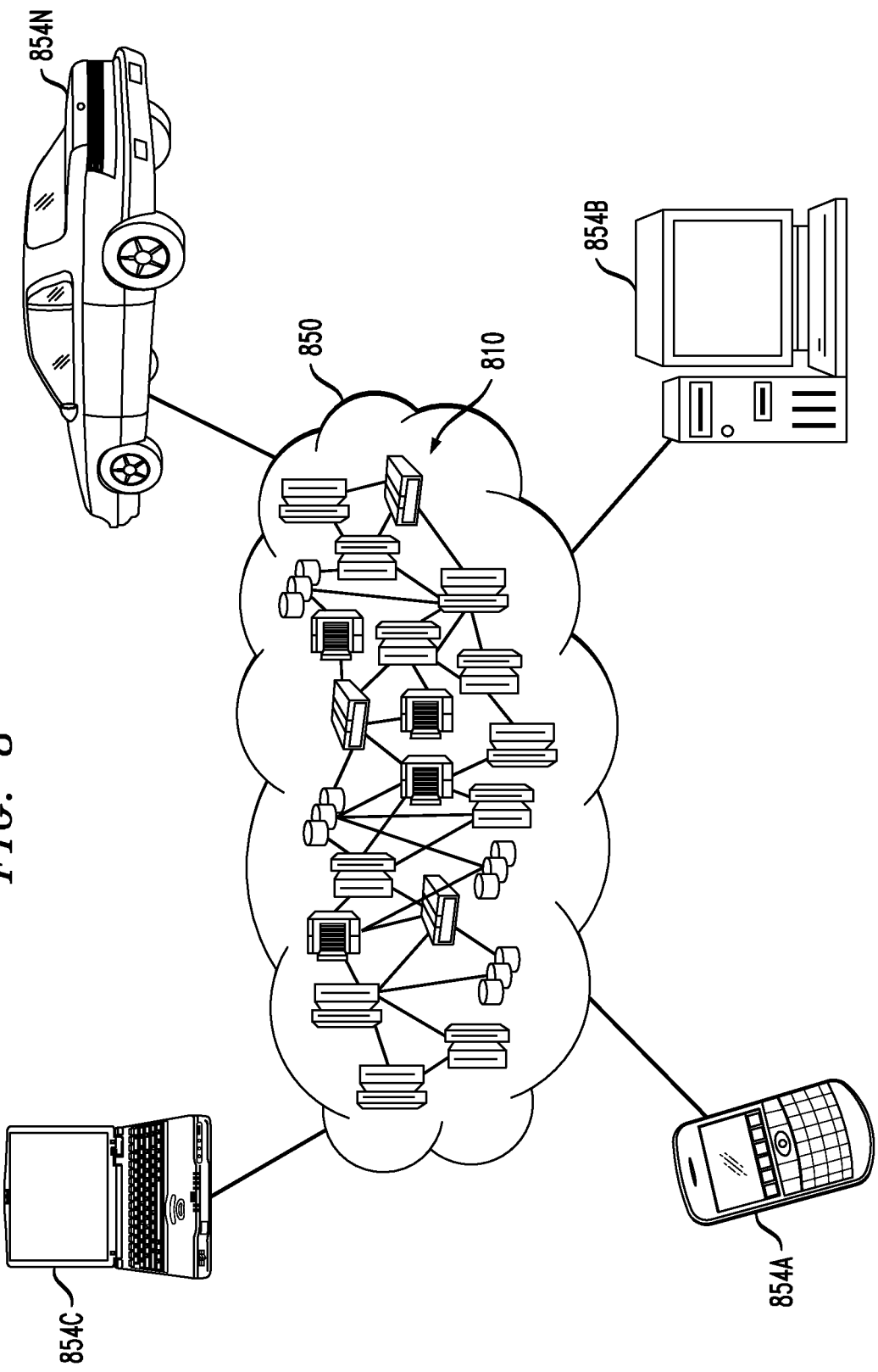
FIG. 8 depicts a cloud computing environment, according to an embodiment of the invention.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
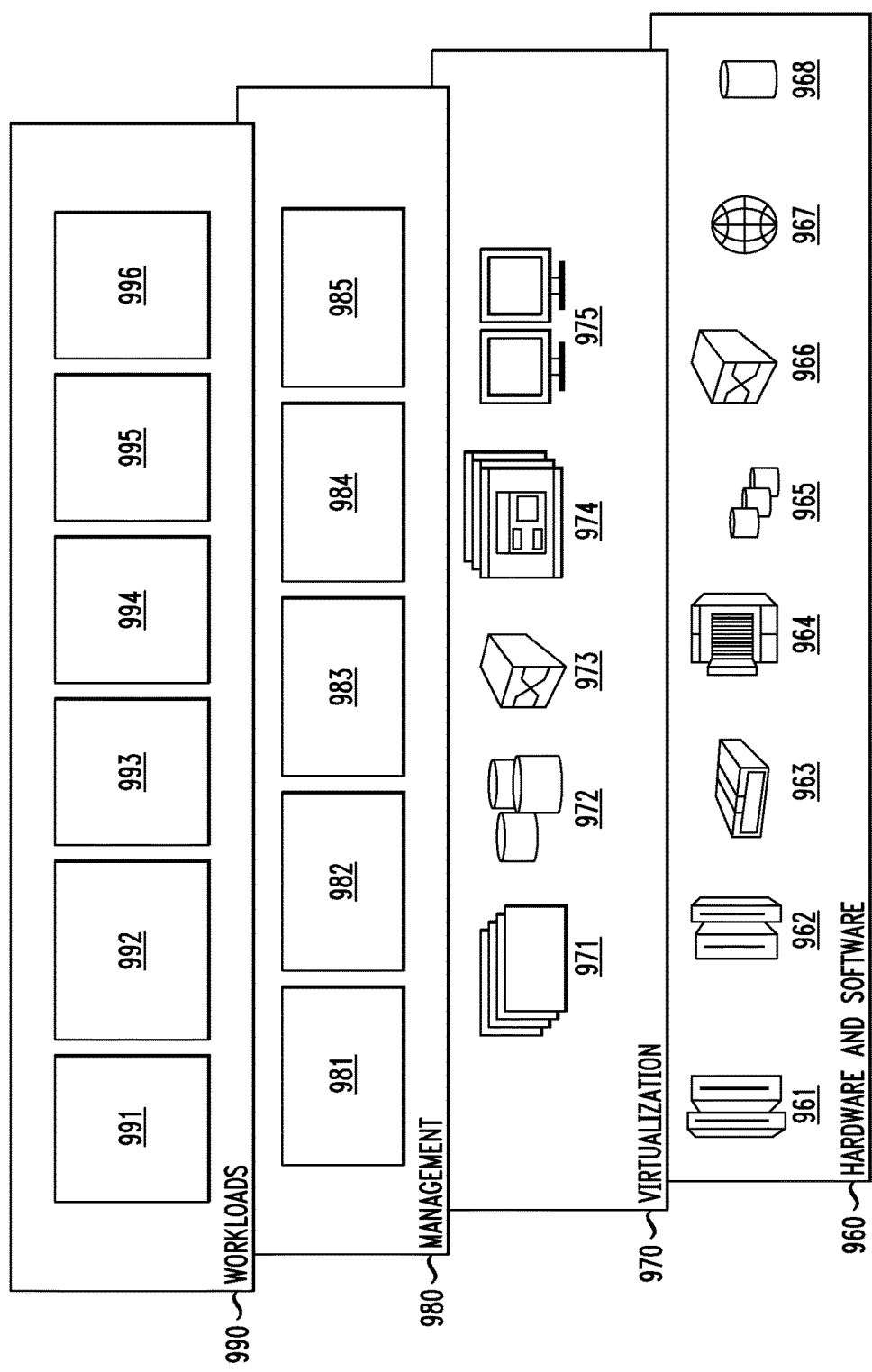
FIG. 9 depicts abstraction model layers according to an embodiment of the invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and content controller 996, which may implement at least a portion of the functionality described above with respect to FIGS. 1-6.

What is claimed is:
1. A method comprising:
presenting content on a display associated with a computing device;
determining one or more security characteristics associated with respective portions of the content on the display;
detecting a presence of one or more individuals proximate to the display associated with the computing device;
modifying presentation of at least one of the portions of the content on the display based on an authorization status of at least one individual proximate to the display associated with the computing device and responsive to determining that the at least one portion of the content on the display is subject to a given security restriction based on the security characteristics associated with the at least one portion of the content on the display; and
generating a notification for presentation on the display indicating that presentation of the at least one portion of the content on the display has been modified, the notification being at least one of continuously displayed and periodically generated until the modified presentation of the at least one portion is reverted to its original presentation or removed from presentation on the display;
wherein modifying presentation of the at least one portion of the content on the display comprises replacing the at least one portion of the content with alternate content not subject to the given security restriction such that the modified presentation of the at least one portion of the content is hidden;
wherein the method is performed at least in part by the computing device.

2. The method of claim 1, further comprising modifying presentation of at least one other portion of the content on the display by adjusting one or more graphical characteristics of the at least one other portion of the content to obscure the at least one other portion of the content on the display based on the authorization status of at least one individual proximate to the display associated with the computing device and responsive to determining that the at least one other portion of the content on the display is subject to at least one security restriction based on the security characteristics associated with the at least one other portion of the content on the display.

3. The method of claim 1, further comprising modifying presentation of at least one other portion of the content on the display by adjusting one or more graphical characteristics of the at least one other portion of the content to shrink a size of the at least one portion of the content on the display based on the authorization status of at least one individual proximate to the display associated with the computing device and responsive to determining that the at least one other portion of the content on the display is subject to at least one security restriction based on the security characteristics associated with the at least one other portion of the content on the display.

4. The method of claim 1, wherein the at least one portion of the content on the display comprises content of a first type and the alternate content comprises content of a second type different than the first type.

5. The method of claim 1, wherein the at least one portion of the content on the display comprises content of a first type and the alternate content comprises additional content of the first type not subject to the given security restriction.

6. The method of claim 1, further comprising modifying presentation of at least one other portion of the content on the display by adjusting one or more graphical characteristics of the at least one other portion of the content on the display to fade the at least one other portion of the content on the display as a function of time based on the authorization status of at least one individual proximate to the display associated with the computing device and responsive to determining that the at least one other portion of the content on the display is subject to at least one security restriction based on the security characteristics associated with the at least one other portion of the content on the display.

7. The method of claim 1, wherein modifying presentation of the at least one portion of the content is responsive to detecting an absence of at least one individual authorized to view the at least one portion of the content based on the security characteristics associated with the at least one portion of the content.

8. The method of claim 1, wherein detecting the presence of one or more individuals proximate to the computing device utilizes at least one of motion detection, facial recognition, voice recognition and gaze detection.

9. The method of claim 1, wherein detecting the presence of one or more individuals proximate to the computing device is based on input to one or more input devices associated with the computing device, the input comprises at least one of keyboard strokes, mouse movement and touchscreen input.

10. The method of claim 1, wherein the authorization status of the at least one individual proximate the display associated with the computing device is based on at least one of:
 positively identifying the at least one individual; and
 being unable to positively identify the at least one individual.

11. The method of claim 1, wherein detecting the presence of one or more individuals proximate to the computing device is based on at least one proximity threshold, the at least one proximity threshold being set based on at least one of user input and history of use of the computing device.

12. The method of claim 1, wherein the one or more security characteristics indicate security levels associated with respective portions of the content, the security levels being based on at least one of:
 textual analysis of content on the display;
 image analysis of content on the display; and
 specified labeling of content on the display.

13. The method of claim 1, wherein generating the notification further comprises providing one or more user interface options to at least one of:
 continue the modified presentation of the at least one portion of the content on the display;
 revert the modified presentation of the at least one portion of the content on the display to its original presentation; and
 remove the at least one portion of the content from presentation on the display.

14. The method of claim 1, wherein the security characteristics comprise specification of one or more individuals or classes of individuals authorized to view the at least one portion of the content.

15. The method of claim 1, wherein modifying presentation of the at least one portion of the content is further based on positions and viewing angles of the individuals proximate to the display of the computing device.

16. The method of claim 1, wherein the alternate content comprises the at least one portion of the content on the display with one or more parts thereof that are subject to the given security restriction substituted with generic replacements not subject to the given security restriction.

17. The method of claim 16, wherein the one or more parts of the at least one portion of the content comprise one or more specified figures, numbers, words or graphics.

18. An article of manufacture comprising a computer readable storage medium for storing computer readable program code which, when executed, causes a computing device:
 to present content on a display associated with a computing device;
 to determine one or more security characteristics associated with respective portions of the content on the display;
 to detect a presence of one or more individuals proximate to the display associated with the computing device;
 to modify presentation of at least one of the portions of the content on the display based on an authorization status of at least one individual proximate to the display associated with the computing device and responsive to determining that the at least one portion of the content on the display is subject to a given security restriction based on the security characteristics associated with the at least one portion of the content on the display; and
 to generate a notification for presentation on the display indicating that presentation of the at least one portion of the content on the display has been modified, the notification being at least one of continuously displayed and periodically generated until the modified presentation of the at least one portion is reverted to its original presentation or removed from presentation on the display;
 wherein modifying presentation of the at least one portion of the content on the display comprises replacing the at least one portion of the content with alternate content not subject to the given security restriction such that the modified presentation of the at least one portion of the content is hidden.

19. An apparatus comprising:
 a computing device comprising a processor coupled to a memory;
 the computing device being configured:
 to present content on a display associated with a computing device;
 to determine one or more security characteristics associated with respective portions of the content on the display;
 to detect a presence of one or more individuals proximate to the display associated with the computing device;
 to modify presentation of at least one of the portions of the content on the display based on an authorization status of at least one individual proximate to the display associated with the computing device and responsive to determining that the at least one portion of the content on the display is subject to a given security restriction based on the security characteristics associated with the at least one portion of the content on the display; and
 to generate a notification for presentation on the display indicating that presentation of the at least one portion of the content on the display has been modified, the notification being at least one of continuously displayed and periodically generated until the modified presentation of the at least one portion is reverted to its original presentation or removed from presentation on the display;
 wherein modifying presentation of the at least one portion of the content on the display comprises replacing the at least one portion of the content with alternate content not subject to the given security restriction such that the modified presentation of the at least one portion of the content is hidden.

20. The apparatus of claim 19, wherein the computing device comprises a mobile computing device.

\* \* \* \* \*